(12) United States Patent
Perret

(10) Patent No.: US 8,521,804 B2
(45) Date of Patent: Aug. 27, 2013

(54) INTERCONNECTION SYSTEM BETWEEN AT LEAST ONE COMMUNICATION DEVICE AND AT LEAST ONE REMOTE DATA SYSTEM AND INTERCONNECTION METHOD

(75) Inventor: Stephane Perret, Saint Martin d'Heres (FR)

(73) Assignee: Mobile Service, St. Vincent de Mercuze (FR)

( * ) Notice: Subject to any disclaimer, the term of this patent is extended or adjusted under 35 U.S.C. 154(b) by 214 days.

(21) Appl. No.: 12/680,429

(22) PCT Filed: Oct. 9, 2008

(86) PCT No.: PCT/FR2008/001419
§ 371 (c)(1),
(2), (4) Date: Apr. 6, 2010

(87) PCT Pub. No.: WO2009/087283
PCT Pub. Date: Jul. 16, 2009

(65) Prior Publication Data
US 2010/0235422 A1    Sep. 16, 2010

(30) Foreign Application Priority Data
Oct. 11, 2007  (FR) ...................................... 07 07147

(51) Int. Cl.
*G06F 15/16*  (2006.01)
(52) U.S. Cl.
USPC ............................ 709/201; 709/203; 709/224
(58) Field of Classification Search
USPC ......... 709/201, 202, 203, 208–211, 223–224; 370/338, 351, 16, 346, 347, 328, 310, 252, 370/469, 315, 241, 421, 216; 455/466
See application file for complete search history.

(56) References Cited

U.S. PATENT DOCUMENTS 7,634,558 B1 * 12/2009 Mangal et al. ................ 709/224
7,647,036 B2 * 1/2010 Omae et al. .................... 455/411

(Continued)

FOREIGN PATENT DOCUMENTS

| EP | 1 715 656 A1 | 10/2006 |
| WO | WO 2006/136660 A1 | 12/2006 |
| WO | WO 2007/072125 A1 | 6/2007 |

OTHER PUBLICATIONS

Huttunen et al., "UDP Encapsulation of IPsec ESP Packets," Jan. 2005, IETF Network Working Group, tools.ietf.org/html/rfc3948.*

(Continued)

*Primary Examiner* — Ruolei Zong
(74) *Attorney, Agent, or Firm* — Oliff & Berridge, PLC

(57) ABSTRACT

The interconnection system comprises at least one preferably mobile communication device which can be connected to a remote data system by a communication channel enabling firewalls to be by-passed. The communication device comprises means for emitting presence signals. A service component of the communication device establishes a communication channel to a remote service agent of the remote data system, that is assigned thereto. The service component of the communication device indicates its presence at regular intervals by notification signals to the remote service agent in order to keep the communication channel active. The period of the notification signals is defined by the remote service agent at least once after the channel has been established. The remote service agent can then send messages in real time to the service component.

7 Claims, 5 Drawing Sheets

(56) References Cited

U.S. PATENT DOCUMENTS

| | | | |
|---|---|---|---|
| 2003/0128676 A1* | 7/2003 | Lee | 370/328 |
| 2007/0019610 A1* | 1/2007 | Backholm et al. | 370/349 |
| 2007/0058599 A1* | 3/2007 | Harsch | 370/338 |
| 2007/0140193 A1* | 6/2007 | Dosa et al. | 370/338 |
| 2007/0150946 A1 | 6/2007 | Hanberger et al. | |
| 2007/0202837 A1* | 8/2007 | Araki et al. | 455/343.3 |
| 2008/0154913 A1* | 6/2008 | Kohonen | 707/10 |

OTHER PUBLICATIONS

French Preliminary Search Report for French Application No. FR 07 07147, Jul. 11, 2008 (w/ English translation).

International Search Report for International Application No. PCT/FR2008/001419, mailed on May 18, 2009 (w/ English translation).

* cited by examiner

INTERCONNECTION SYSTEM BETWEEN AT LEAST ONE COMMUNICATION DEVICE AND AT LEAST ONE REMOTE DATA SYSTEM AND INTERCONNECTION METHOD

BACKGROUND OF THE INVENTION

The invention relates to an interconnection system comprising at least one communication device and at least one remote data system, the communication device comprising:
- at least a first network connection link,
- at least one service component connected to the first network connection link and comprising means for emitting presence notification signals with a predefined period, each service component of the communication device being associated with a remote data system comprising:
- a second network connection link,
- and a remote service agent assigned to said service component, said remote service agent being connected to said second network connection link.

The invention also relates to a method for interconnecting a communication device to at least one remote data system.

STATE OF THE ART

A company that wants to set up a mobile service or application with enabled access to its data system via Internet has the choice between two options. It can use the solutions proposed by mobile phone operators with voice, SMS message and/or Visio services. It can also use the data service (connection to Internet via a cellular network) provided by mobile operators directly, and the available wireless local networks. The latter option in which the networks converge to the Internet access is announced as being the future of all mobile communication. In this respect, voice services using Voice Over Internet Protocol (VOIP) already exist with the first signs of extension to domestic wireless networks.

The infrastructures of mobile operators integrate solutions to the problems of bidirectional exchanges between a remote data system and mobile equipment devices. These offers are however fragile as they are limited to use of the mobile operator's infrastructure and do not enable users to take advantage of free wireless local networks. Moreover, they are not secured other than by the guarantee of confidentiality given by the operator to his customers.

Local networks are becoming increasingly popular in particular due to the development of wireless technologies such as WIFI (Wireless Fidelity). This increased Internet connection potential is accompanied by the use of dynamic address masking and access protection mechanisms via firewalls and address translation. A device connected on this type of network is not directly accessible from the outside.

Embedded solutions enabling real-time data access also exist on mobile phones. In particular in the electronic mail field, solutions referred to as push-mail (when it is received, the e-mail is pushed to a local messaging customer of a user without the latter requesting it) enable a user to receive his or her e-mails in real time if the mobile phone is covered by the mobile operator's network. These solutions use remote servers on which a user is registered. When one of these servers receives an e-mail addressed to a registered user, the e-mail is pushed to the user's mobile phone via a special gateway set up between the server and the telephone operator. One of the drawbacks of these solutions is that the user is dependent on the phone network coverage to be able to receive the messages and that such account subscriptions are expensive.

Another approach is the use of VOIP and in particular of Session Initiation Protocol (SIP) technology. The SIP protocol enables a service component of a communication device to use an Internet Protocol (IP) link to register with a public server. A computer on the Internet can be reached by means of a couple formed by its IP address and its port. When the communication device, for example a telephone, is active, it connects up to the public server which retrieves the couple enabling the communication device to be reached. Thus, any person wishing to send messages to the communication device can simply lodge an enquiry with the public server to retrieve the IP address and the port on which the telephone can be reached. This approach does however have a major shortcoming. Nowadays in fact, a device connected to the Internet does not necessarily have a public IP address. That is to say it is not able to be reached directly. Protection systems of firewall type first have to be by-passed. This involves modifications as far as the firewall configuration is concerned to make each telephone located behind such firewalls accessible.

The Virtual Private Network (VPN) technology is a means of opening a secured channel with a private network within which the data system is located. When access via VPN is involved, the communication channel is open solely between a communication device and a private network, which effectively enables the data system to contact the communication device. However, the scope of data systems able to be reached is limited to the systems available via the private network to which the communication device is connected, thereby excluding any real notion of multiservices. Opening a secured channel of VPN type is moreover a risky solution in terms of security, as one then finds oneself directly in the private network hosting the data system.

The document EP-A1-1715656 describes the use of a wireless connection for sending messages from a remote data system to a communication device. The remote data system can detect connection or non-connection of the communication device from presence notification signals emitted by the communication device. When a communication device connects up, it in fact registers with the data system and then indicates its presence at regular intervals. When a message cannot be delivered following non-connection of the communication device, the messages to be transmitted are stored in the remote data system pending reconnection of the communication device. The remote data system deletes the old messages that have remained stored for too long. Such a system is not optimized for detection of disconnection of the communication device and does not enable protection systems of firewall and address translation type to be by-passed.

The document WO2006/136660 describes a method for maintaining an IP Internet connection between a mobile device and a server, for example a mail server. During a period of inactivity of the network, connection keep-alive messages are sent at predetermined intervals by the mobile device to the server and/or vice-versa. The purpose of these connection keep-alive messages is to act on a cellular network gateway to the IP network so that the operator's timers supervising this gateway do not cut the connection off. Such a method only acts on the gateway and does not enable use of the server resources to be limited.

OBJECT OF THE INVENTION

The object of the invention is to provide an interconnection system with the purpose of avoiding the shortcomings of known systems. More particularly it has to enable contact to be maintained permanently between communication devices, in particular mobile devices, and remote data systems via secured networks, whatever the type of wireless network available. Furthermore, it enables it to be known whether the mobile device is still connected to the remote data system with determined and adjustable fineness while at the same time keeping communication costs down.

This object is achieved by a system according to the appended claims. In particular, it is achieved by the fact that the service component and the remote service agent that is assigned to the latter are connected by a communication channel that is assigned thereto, the presence notification signals being transmitted by means of the communication channel, and by the fact that the remote service agent comprises:
- means for adjusting the emission period of the service component presence notification signals, and
- detection means for detecting isolation of the service component with respect to the remote service agent in the absence of receipt of a presence notification signal from the service component.

Such a system enables the communication device to be reached, in inexpensive manner, at all times so long as the latter is covered by an Internet network.

It is a further object of the invention to provide an interconnection method between a communication device and at least one remote data system of such an interconnection system. This method successively comprises the following steps:
- the service component establishes an Internet connection,
- the service component establishes a communication channel with the corresponding remote service agent via the Internet connection,
- the service component sends presence notification signals to the remote service agent with an adjustable period defined by the remote service agent at least once after the communication channel has been established,
- the remote service agent receiving the presence notification signals compares the time elapsed since receipt of the last presence notification signal with a preset threshold, and, if this time becomes longer than the threshold without a new presence notification signal being received, the remote service agent deduces from this that the service component is no longer able to be reached and deletes the communication channel.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
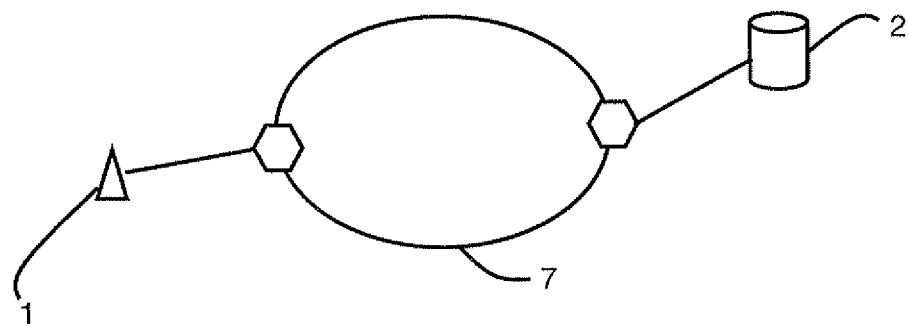
FIG. 1 illustrates an interconnection system between a communication device and a remote data system.
Figure 2:
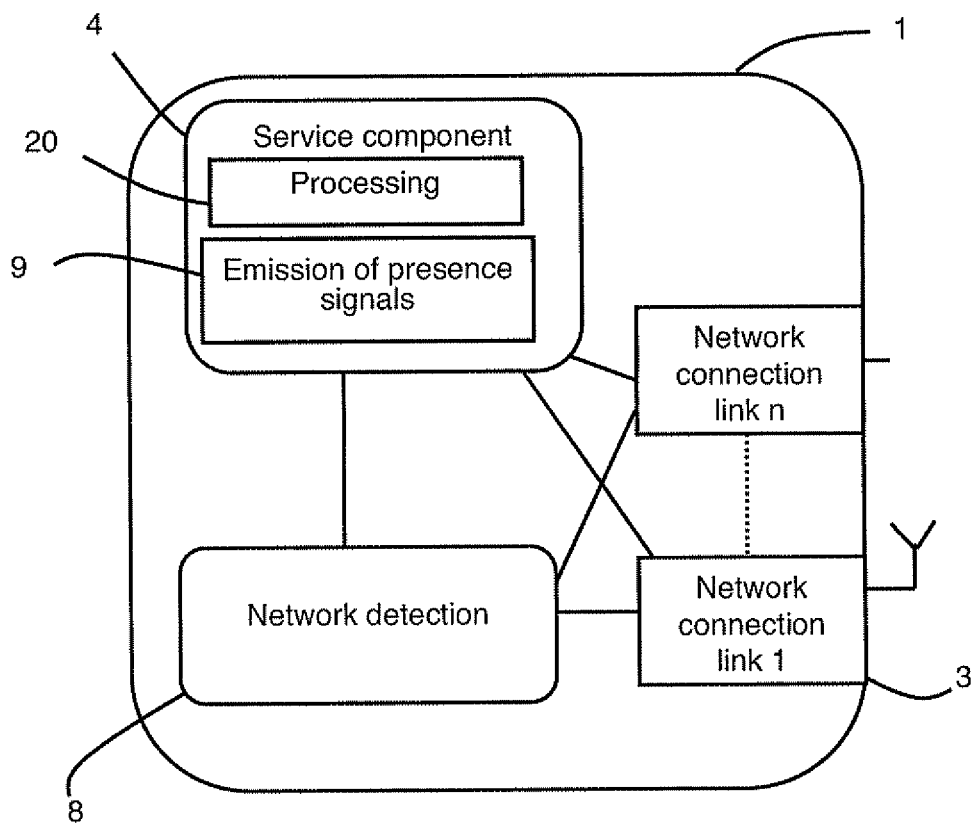
FIG. 2 schematically illustrates the composition of the communication device.
Figure 3:
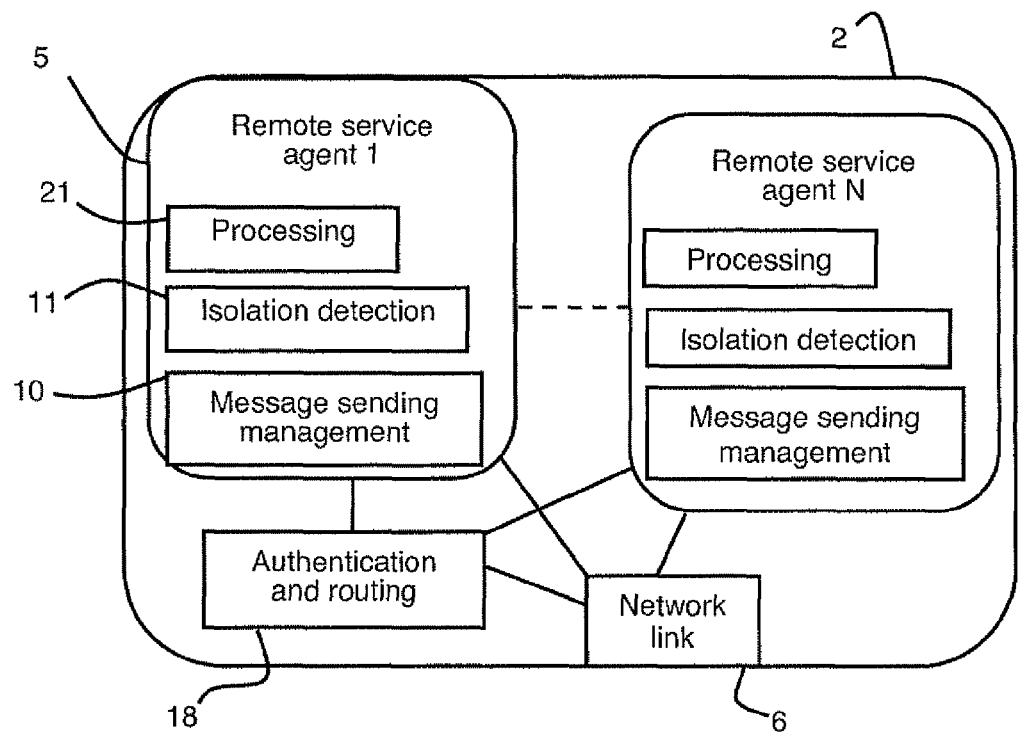
FIG. 3 schematically illustrates the composition of the remote data system.
Figure 6:
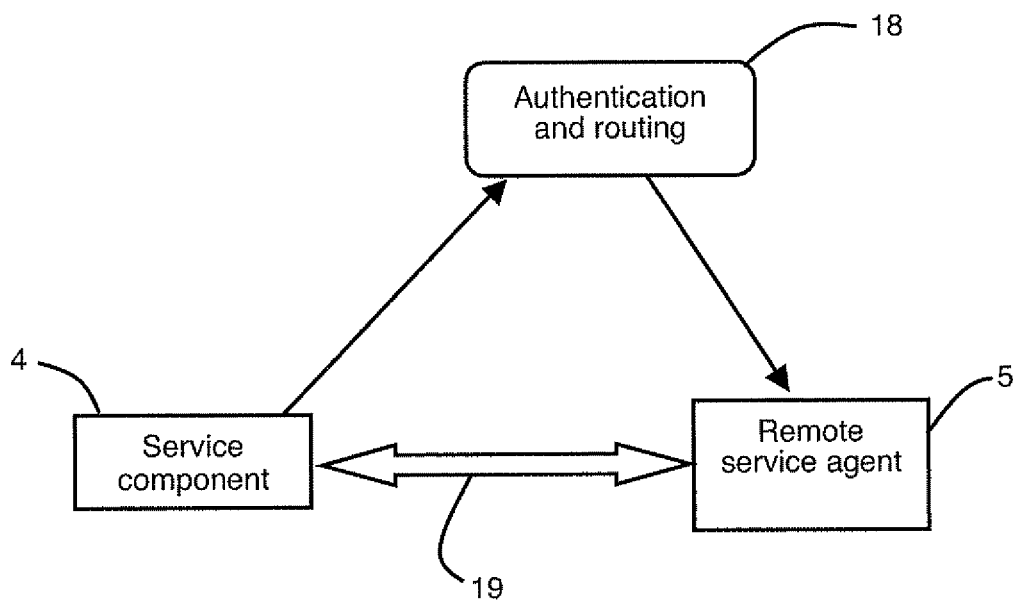
FIG. 6 illustrates an interconnection system according to the invention with a communication channel.

The interconnection system illustrated in FIGS. 1 to 3 comprises at least one communication device 1 and at least one remote data system 2. Communication device 1 comprises at least one network connection link 3 and at least one service component 4 connected to network connection link 3. In the particular embodiment illustrated in FIG. 2, communication device 1 comprises n network connection links 3. Remote data system 2 comprises at least one remote service agent 5 assigned to a service component 4 (in FIG. 3, the service agents are represented from 1 to N), authentication and routing means 18 and a network connection link 6. Network connection link 6 is connected to remote service agent 5 and to authentication and routing means 18, and authentication and routing means 18 are connected to each remote service agent 5. Communication device 1 and remote data system 2 can be connected via one of the network links 3, via an Internet link 7, to network connection link 6. As illustrated in FIG. 6, after authentication, a communication channel 19 is established between service component 4 and associated remote service agent 5 using Internet link 7. After authentication of service component 4, authentication and routing means 18 route service component 4 to remote service agent 5 that is associated to the latter, which enables communication channel 19 to be established.

Communication device 1 can for example be a mobile phone, a personal assistant, an embedded mobile system, etc. Network connection links 3 are defined as being network protocols for example enabling connection to a wireless network of WIFI type, to an infrared connection or establishing a link via radiofrequency waves. Communication device 1 comprises network detection means 8 to detect the presence of networks (WIFI, infrared, radiofrequency, etc.) accessible by communication device 1. These network detection means 8 are connected to service component 4. The role of service component 4 is to provide a user with a service. For example purposes, a weather forecast service informs the user of changes in the weather, and a stock market service enables the user to follow the progression of the stock market prices on his communication device 1.

Service component 4 comprises means for emitting presence notification signals 9, with a predetermined period that is adjustable at least once by remote service agent 5, signals 9 being designed to be transmitted to remote service agent 5 via communication channel 19.

Remote service agent 5 comprises processing means 21 and detection means 11 to detect whether communication device 1 is isolated, i.e. whether service component 4 can no longer be joined by communication channel 19. For this, when communication channel 19 is established between service component 4 and remote service agent 5, communication device isolation detection means 11 cooperate with means 9 for emitting presence notification signals of service component 4. Transmission of the presence notification signals by communication channel 19, at regular intervals, enables remote service agent 5 to determine whether the mobile device is isolated from the network, in the absence of receipt of presence notification signals, but also to keep communication channel 19 active.

Authentication and routing means 18 of remote data system 2 enable communication channel 19 between service component 4 and the associated remote service agent 5 to be created. For a given service component 4, authentication and routing means 18 create a channel between service component 4 and the associated remote service agent 5. This communication channel 19 is preferably secured and can use the Secure Socket Layer (SSL) protocol. The use of secured authentication and routing means 18 enables service component 4 to contact a remote service agent 5 whose data may be confidential, require a subscription, for example a bank application communicating data on bank accounts or stock market transactions, or may involve the person's private life and require protection. The SSL protocol is a client/server protocol complying with four security objectives. The first is authentication of the server, the second is confidentiality of the exchanged data, the third is integrity of the exchanged data and, finally, it can optionally provide authentication of the client by using a digital certificate. Naturally when a secured communication channel 19 is used, authentication and routing means 18 are not limited to SSL protocol. For example, the protocols used can be TLS (Transport Layer Security) and D-TLS (Datagram Transport Layer Security).

Before giving access to remote service agent 5, authentication and routing means 18 check whether service component 4 is authorized to connect and then create a communication channel 19 between service component 4 and remote service agent 5 that is assigned thereto. In addition, if a disconnection phase is involved, authentication and routing means 18 have to be informed of this. In general, to identify with authentication and routing means 18 of remote data system 2 when the request to establish a connection is made, service component 4 sends an identifier and password couple enabling authentication and routing means 18 to check the identity of service component 4 and to create communication channel 19 to remote service agent 5 that is assigned thereto. It also sends relevant data corresponding to its profile. Communication channel 19 enables security systems and in particular firewalls to be by-passed as it is initiated by communication device 1. Once communication channel 19 has been set up, remote service agent 5 can send messages to service component 4 without any action from the latter. Service component 4 can also naturally request data from remote service agent 5 which replies thereto. Communication channel 19 is kept active by the presence notification signals, preventing interruption thereof when no message is exchanged and enabling rapid detection of whether the mobile device is still connected to the network.

Figure 5:
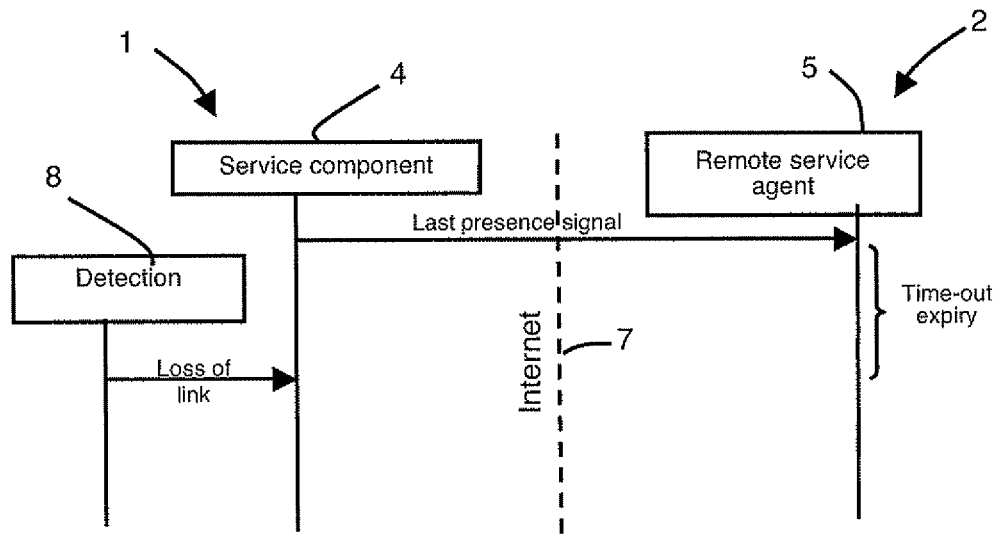
FIG. 5 illustrates, in diagram form, the data exchange enabling isolation of the communication device to be detected.

As illustrated in FIG. 5, isolation between the network and communication device 1 is detected by remote service agent 5 by detection means 11. After an Internet connection has been established by service component and a communication channel 19 has then been established between service component 4 and remote service agent 5, service component 4 then indicates its presence to remote service agent 5 at regular intervals, the interval being defined by remote service agent 5 via communication channel 19. Remote service agent 5 compares the time elapsed from receipt of a presence notification signal with a predefined threshold. If after receipt of a presence notification signal, this threshold is exceeded without any new presence notification signal being received by remote service agent 5, i.e. on expiry of a time-out corresponding to this threshold, remote service agent 5 deduces therefrom that communication device 1 is isolated. Isolation having been detected, remote service agent deletes communication channel 19 to service component 4 of communication device 1. On the service component 4 side, when network detection means 8 detect that no network is available (loss of link), they inform service component 4 thereof and the latter then deletes communication channel 19 to remote service agent 5 on the communication device 1 side.

Thus, the remote data system ceases any sending of data to communication device 1 if it detects a loss of connection, thereby economizing its resources and its bandwidth. Data systems in fact process data and, under certain conditions corresponding to heavy load on its central processing unit and its bandwidth, for example connection overload of communication devices 1, inactive connections have to be cut off as soon as possible. This type of emergency situation can lead to a modification of the emission period of presence notification signals of service component 4 by remote agent 5 which seeks to economize the resources of remote data system 2. For this, remote service agent 5 comprises means for adjusting the emission period of the presence notification signals of service component 4.

When a communication channel 19 is established, remote service agent 5 can send messages to service component 4 and vice-versa. Remote service agent 5 sends messages according to the "applicative push" principle, i.e. messages are sent to the service component without the latter requesting this be done. The messages are simply pushed in real time to communication device 1 according to requirements. For example, for a stock market service, if the prices rise or fall, service component 4 will be kept informed by remote service agent 5 continuously on a time basis of about one minute, whereas if the price quotation remains stable, sending of data every hour will be deemed to be sufficient.

Figure 4:
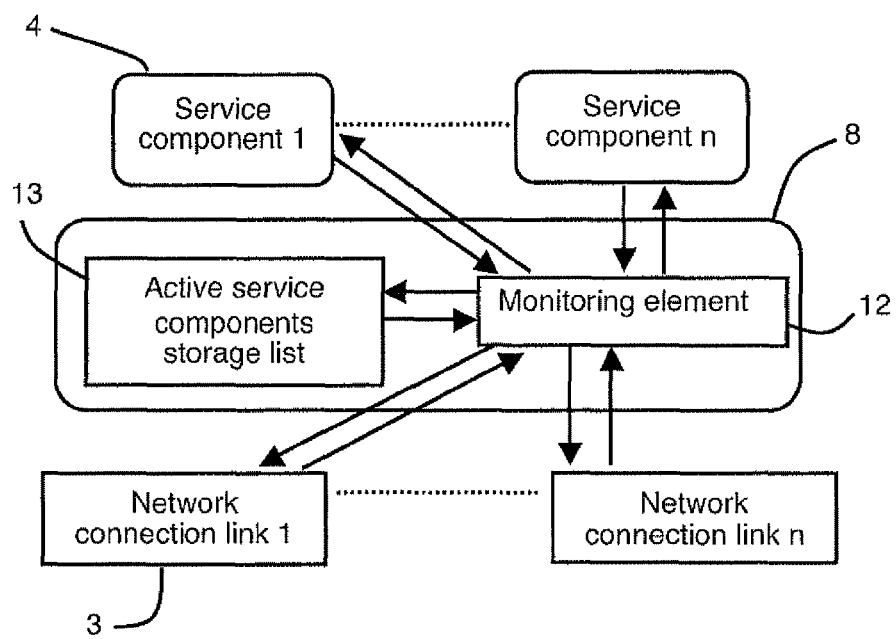
FIG. 4 illustrates the network detection means of the communication device in more detailed manner.

In the particular embodiment illustrated in FIG. 4, network detection means 8 designed to detect the networks accessible by communication device 1 comprise a monitoring element 12 and an active service component storage list 13. Communication device 1 can comprise several service components 4 (from 1 to n in FIG. 4). The latter can be active, i.e. wanting to connect up to a corresponding remote service agent 5, and are therefore interested in knowing the accessible network connection links 3. When a service component 4 is activated, it informs monitoring element 12 of this, which element then stores an identifier of each of the service components 4 that are declared active in its storage list 13. As soon as one or more network connection links 3 becomes active, monitoring element 12, which monitors the availability of each of the network connection links 3, retrieves the list of all the active service components 4 from storage list 13 and contacts each of these components 4 to inform them that a network connection link 3 is accessible. In this way, each service component 4 can establish an Internet connection via one of the accessible networks and then set up a communication channel 19, passing via authentication and routing means 18 of remote data system 2. When several types of connection (WIFI, infrared, radiofrequency, etc.) are accessible, service component 4 uses the most reliable and fastest connection. If a service component 4 wants itself to be deactivated, it contacts monitoring element 12 to inform the latter that it is no longer interested by the active network connection links 3. Monitoring element 12 then removes the data associated with service component 4 concerned from the active components storage list 13.

In a preferred embodiment, at the time communication channel 19 is established, as soon as the request to open channel 19 is made, service component 4 sends data on the type of network connection link 3 used to establish communication channel 19. In response, remote service agent 5 sets the value of the period, with which presence notification signal emitting means 9 have to send these signals, by means of its period adjustment means. This period can be automatically optimized according to the type of network used. The value of the presence notification signal emission period can therefore be defined by remote service agent 5 according to at least one or more of the following attributes sent by the communication device at the time the request to establish communication channel 19 is made:

- the type of network such as WIFI, GPRS (General Packet Radio Service), GSM (Global System for Mobile Communications), UMTS (Universal Mobile Telecommunications System), third generation (3G), WIMAX or other,
- the access point corresponding to the name of the network from which the communication device connects up enabling certain situations to be identified,
- the network operator, enabling to be known if connection is made with a roaming operator who is able to apply additional fees on the exchanged data,
- known and free-of-fees private wireless network.

For example purposes, this period becomes shorter as the network bandwidth becomes higher (higher for a WIFI connection than for an infrared connection) and/or as costs become lower (for example private WIFI connection). During the establishment of the communication channel 19, the remote data system can compute a minimum value of the presence notification signal emission period on receipt of the data relative to the network. This minimum value can be determined according to the type of network and to a value predefined by the processing means. If the applicative part of the remote data system requires presence notification signals to be sent every 5 seconds but the network on which the communication device is connected can only support sending of signals every 10 seconds, the higher of the two values will be taken in all cases.

During the period of activity of communication channel 19, remote service agent 5 can further automatically adjust the presence notification signal emission period of service component 4 according to an emergency threshold. The emergency threshold can in particular be modified if remote service agent 5 needs to know the connection status of service component 4 more finely. For example, if there is a stock market crash, the remote service agent will change the emergency threshold so as to determine a network isolation of communication device 1 more finely, in consistency with the data messages pushed at an interval of about one second. This mechanism avoids sending hundreds of messages before determining that communication device 1 can no longer be reached, thereby enabling an efficient management of the resources of remote data system 2.

Subsequent adjustment of the presence notification signal emission period by the adjustment means of remote agent 5 can be determined by processing means 20 which inform remote service agent 5 of the new value of the period to be sent to the associated service component 4. If remote service agent 5 is in a state where it knows that service component 4 is still present, it propagates the update of the period to said service component 4 which sends back an acknowledgement of the new value. On receipt of the acknowledgement, remote service agent 5 validates the new value and it is this new value that will be used as threshold to detect a network isolation. If remote service agent 5 does not receive an acknowledgement, it closes communication channel 19.

Figure 7:
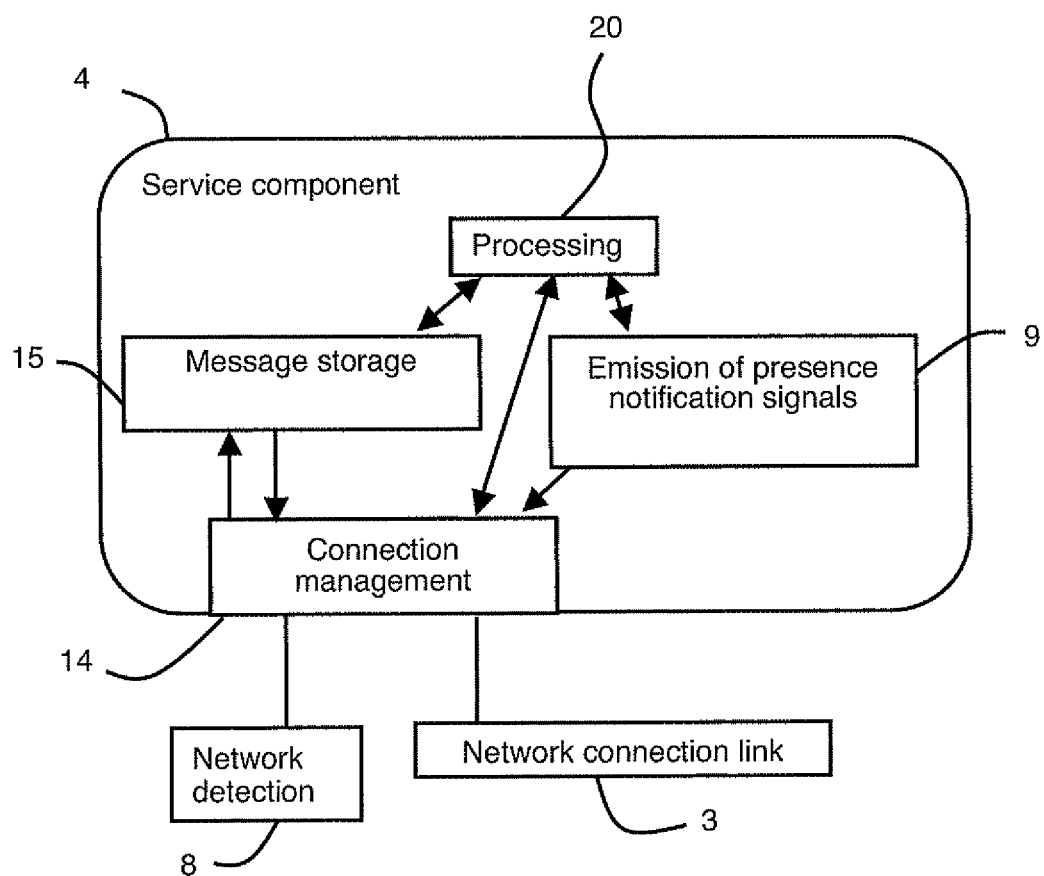
FIG. 7 illustrates a particular embodiment of the service component.

In the particular embodiment illustrated in FIG. 7, service component 4 comprises processing means 20 connected to network connection management means 14, to means 15 for storing messages and to means 9 for emitting presence notification signals. Means 9 for emitting presence notification signals and means 15 for storing the messages of service component 4, and also network detection means 8 and network connection links 3 of communication device 1, are connected to network connection management means 14 of service component 4. When a communication channel 19 is established, the messages are sent by service component 4 to remote service agent 5, via communication channel 19, by network connection management means 14. If communication channel 19 is not active, the messages are stored in means for storing 15. For example purposes, means for storing 15 can be persistent media such as hard disk, memory, etc. When communication channel 19 is established again, network connection management means 14 retrieve the pending messages in means for storing 15 the messages and send them to remote service agent 5. Means for storing 15 can constitute a FIFO stack (First In First Out) in which the first message to arrive is delivered first. By means of a priority mechanism, important messages can be stored at the bottom of the stack to be delivered first when reconnection takes place. A similar architecture is to be found at the level of remote service agent 5 (FIG. 8) which has connection management means 16 connected to message storage means 17 and to processing means 21, also connecting message storage means 17, each means being connected to network connection link 6. Communication channel 19 between service component 4 and remote service agent 5 is thus established between network connection management means 14 and 16. Pending messages can be deleted after a certain time if delivery thereof is of no benefit to the user. For example, messages containing the weather forecast for the previous day are not relevant and will not be delivered.

Figure 8:
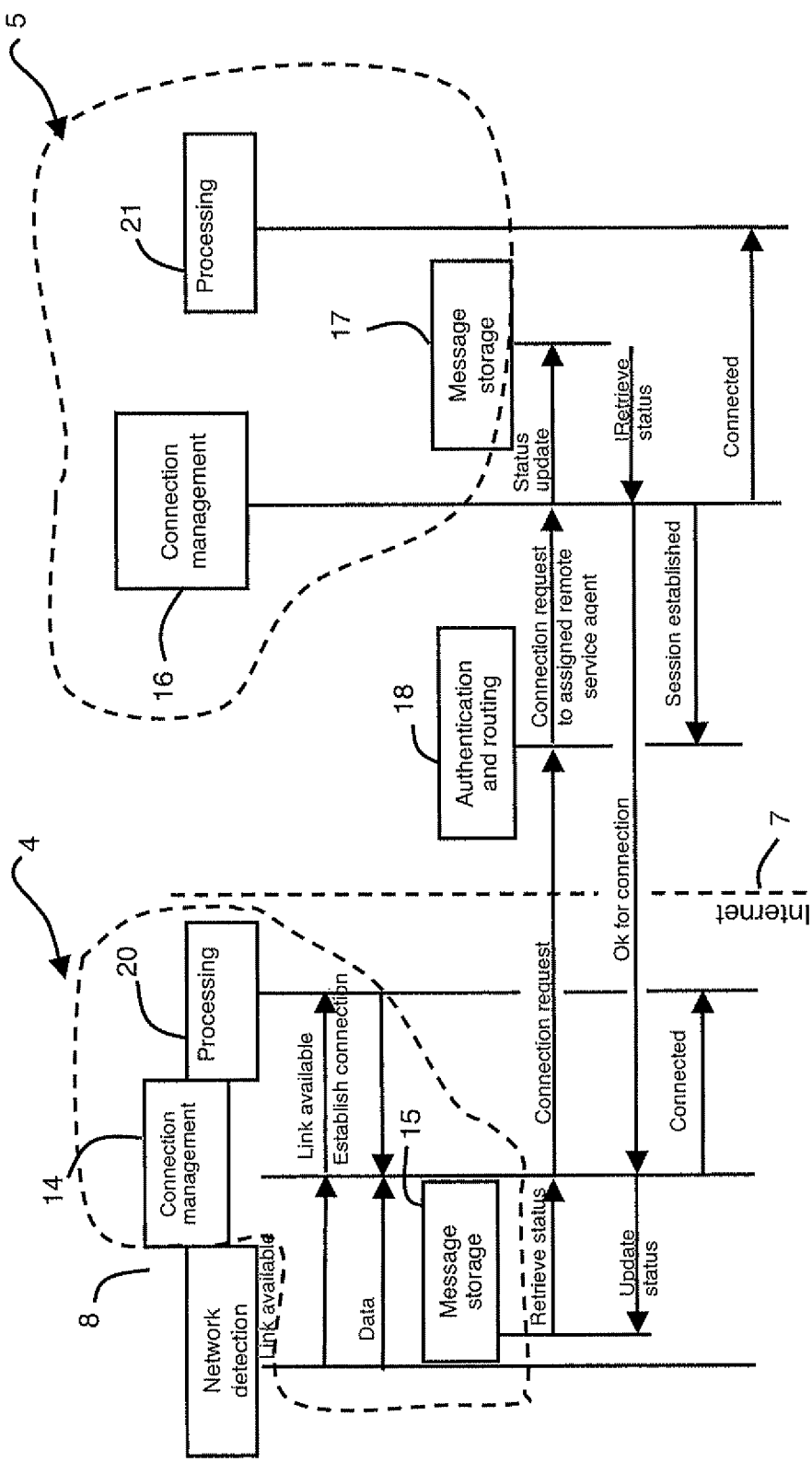
FIG. 8 illustrates the connection diagram of a particular embodiment of an interconnection system according to the invention.

FIG. 8 illustrates the various steps of connection of communication device 1 to remote data system 2. First of all, network detection means 8 of communication device 1 inform ("links available") network connection management means 14 of service component of communication device 1 that at least one network connection link 3 is available. Network connection management means 14 transfer this data ("link available") to processing means 20, i.e. to an applicative part of service component 4 of which they form a part. Processing means 20 decide to connect service component 4 to corresponding remote service agent 5 and inform ("establish connection") network connection management means 14 of service component 4 that a connection has to be established.

The connection request results in an Internet connection being established by the selected network connection link 3. Establishment of the connection triggers sending of data ("data") concerning the selected network from network detection means 8 to network connection management means 14 of service component 4. Network connection management means 14 retrieve ("retrieve status") the data representative of the content of means for storing 15 if necessary, for example the messages themselves, their number, etc. Then they request initialization of communication channel 19 by sending a message to remote data system 2 ("connection request"), transmitted to authentication and routing means 18, containing data on identification of service component 4, the data concerning the network selected and the messages stored in means for storing 15. When the "connection request" message is received by authentication and routing means 18 of remote data system 2, the latter checks whether service component 4 concerned is authorized to connect up to remote service agent 5. If such an authorization is given, the "connection request" message is routed to network connection management means 16 of remote service agent 5 assigned to service component 4 which updates ("status update") its means for storing 17 with the data contained in the received message and which concern the status of means for storing 15 of service component 4. Means 16 then retrieve the new status ("retrieve status") of means for storing 17. Remote service agent 5 sends an answer to service component 4 indicating that connection has been established ("ok for connection") and transmits the emission period chosen for the presence notification signals to the latter. Then it informs processing means 21, remote service agent 5 and authentication and routing means 18 that communication channel 19 has been established. On receipt by network connection management means 14 of service component 4 of the answer "ok for connection" message from remote service agent 5 which informs the service component 4 that connection has been established, connection management means 14 of service component 4 update the status of means for storing messages 15 ("update-status") and inform ("connected") processing means 20 of service component 4 that the connection is active. Then service component 4 activates periodic emission of the presence notification messages according to the data transmitted on the value of this period by remote service agent 5 during the establishment of the communication channel 19 or to a subsequent adjustment of the presence notification signal emission period according to the modifications of the emergency threshold. Service component 4 and remote service agent 5 can then exchange messages via communication channel 19.

In a preferred embodiment illustrated in FIG. 4, communication device 1 comprises a plurality of service components 4, each service component 4 connecting up to a remote service agent 5 to which it is associated. These different and distinct service agents 5 can be located in distinct remote data systems 2. Communication device 1 can thus communicate directly with remote service agents 5 of several remote data systems 2. Communication device 1 then enables access to multi-application content on distinct networks the data of which is transmitted in real time by applicative push without the user having to do anything.

The interconnection system described above solves the problems of by-passing safety components such as address translation, firewalls, etc. Furthermore, it enables a federating service component system to be proposed that is able to provide a final user with data in real time on subjects that interest him (her). Remote service agent 5 is an interface in particular enabling access to a server associated with corresponding remote data system 2, for example a private company server, a bank server, a weather forecast server, etc.

In a general manner, the method for interconnection between a communication device 1 and at least one remote data system 2 comprises at least the following successive steps:

service component 4 establishes an Internet connection,
service component 4 establishes a communication channel 19 with the corresponding remote service agent 5 via the Internet connection,
service component 4 sends presence notification signals to remote service agent 5 with an adjustable period defined by remote service agent 5 at least once after the communication channel has been established, this period being able to be defined according to the type of network and to the recommendations of the remote data system,
remote service agent 5 receiving the presence notification signals compares the time elapsed since receipt of the last presence notification signal with a predefined threshold, and, if this time becomes longer than the threshold without a new presence notification signal being received, remote service agent 5 deduces from this that service component 4 can no longer be reached and deletes the communication channel.

The interconnection system thereby enables several communication devices 1 to be connected to at least one remote data system 2, each service component 4 of each communication device 1 being connected by a communication channel 19 to a specific remote service agent 5 that is associated to the latter. Each remote service agent 5 is then able to determine the applicative presence of corresponding service component 4. The applicative presence of a service component 4 implies activation of service component 4 at the level of communication device 1 and connection of communication device 1 to the Internet network. In order to determine this applicative presence, remote service agent 5 then operates as a fault detector. Receipt of presence notification messages enables remote service agent 5 to determine this applicative presence with a precision which can be adjusted by remote service agent 5. Remote service agent 5 receives the presence notification signals and compares the time elapsed since the last presence notification signal was received with a predefined threshold. If this time becomes longer than the threshold without a new presence notification signal being received, the remote service agent deduces from this that the service component can no longer be reached and it deletes the communication channel. Indeed, after a certain time-out following receipt of a presence notification signal from service component 4, if remote service agent 5 has not received any other presence notification messages, remote service agent 5 considers that the associated service component 4 cannot be reached. The system as described therefore enables a given remote service agent 5 to know whether it is possible to reach the associated service component 4 in the finest possible manner.

The invention is not limited to the particular embodiments described in the above. In particular, the device can be applied to any type of communication device whether it be mobile (telephone, personal organizer etc.) or fixed, such as a workstation.

The invention claimed is:
1. An interconnection system comprising at least one communication device and at least one remote data system, the communication device comprising:
  at least a first network connection link, and
  at least one service component, connected to the first network connection link and comprising means for emitting presence notification signals with a predefined period, each service component of the communication device being associated with a remote data system, the remote data system comprising:
  a second network connection link,
  a remote service agent, assigned to the service component, the remote service agent being connected to the second network connection link, the remote service agent comprising:
    means for adjusting the emission period of the presence notification signals of the service component, and
    means for detecting isolation of the service component with respect to the remote service agent in the absence of receipt of a presence notification signal from the service component, and
  a network detection means to detect the presence of a network accessible by the first network connection link, the network detection means being connected to the service components and comprising a monitoring element connected to the first network connection link and to a storage list of the active service components, each service component declaring itself active to the moni- toring element, the monitoring element indicating the types of network accessible to each active service component;

wherein the service component and the remote service agent that is assigned thereto are connected by a communication channel that is assigned thereto, the presence notification signals being transmitted via the communication channel.

2. The interconnection system according to claim 1, wherein the communication device is mobile.

3. The interconnection system according to claim 1, wherein the communication channel is secured.

4. The interconnection system according to claim 3, wherein the secured communication channel between the service component and the remote service agent is of SSL type.

5. The interconnection system according to claim 1, wherein the service component and the associated remote service agent each comprise means for storing the messages to be transmitted.

6. An interconnection method between a communication device and at least one remote data system of an interconnection system according to claim 1, comprising the following successive steps:

establishing an Internet connection, the step being performed by the service component;

establishing a communication channel with the corresponding remote service agent via the Internet connection, the step being performed by the service component;

sending presence notification signals to the remote service agent with an adjustable period defined by the remote service agent at least once after the communication channel has been established, the step being performed by the service component;

receiving the presence notification signals, the step being performed by the remote service agent;

comparing the time elapsed since receipt of the last presence notification signal with a predefined threshold, the step being performed by the remote service agent; and, if this time becomes longer than the threshold without a new presence notification signal being received, deducing from this that the service component can no longer be reached and deleting the communication channel, the step being performed by the remote service agent, wherein, before the Internet connection is established, the method further comprises the following steps:

declaring itself active to a monitoring element of a network detection means of the mobile device, the step being performed by each service component that is interested; and indicating the types of network accessible to each active service component, the step being performed by the monitoring element of the communication device.

7. The method according to claim 6, wherein, during the establishment of the communication channel, the service component sends data on the first network connection link to the remote service agent which automatically adjusts the sending period of the presence notification signals of the service component according to the type of the first network connection link or to an emergency threshold.

* * * * *